3,657,309
ALKYLHYDROXYPHENYLTHIOLALKANOATES

Martin Dexter, Briarcliff Manor, David H. Steinberg, Bronx, and George E. Ham, Briarcliff Manor, N.Y., assignors to Ciba-Geigy Corporation, Ardsley, N.Y.
No Drawing. Filed May 13, 1968, Ser. No. 728,761
Int. Cl. C07c 153/07
U.S. Cl. 260—455 C
9 Claims

ABSTRACT OF THE DISCLOSURE

Alkylhydroxyphenylalkanoic acid thiolo esters of mono- and polymercaptoalkanes prepared by known thiolo esterification procedures, are stabilizers of organic material subject to oxidative deterioration.

DETAILED DESCRIPTION

This invention relates to alkylhydroxyphenylalkanoic acid thiolo esters of mono- and polymercapto alkanes and to compositions otherwise subject to oxidative deterioration stabilized by the incorporation therein of such thiolo esters.

In particular the present invention pertains to compounds of the formula:

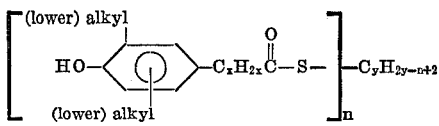

wherein:

$x$ has a value of from 1 to 6;
$y$ has a value of from 2 to 30;
$n$ has a value of from 1 to 6.

By the term "alkyl" and derivations thereof employing the root "alk," such as "alkylene," or "alkylidene," "alkanoyl" and the like, is intended a group containing a branched or straight chain hydrocarbon chain of from 1 to 20 carbon atoms inclusively. Representative of such alkyl groups are thus methyl, ethyl, propyl, isopropyl, butyl, t-butyl, octyl, decyl, dodecyl, tetradecyl, octadecyl, eicosyl and the like. When the term "alkyl" is herein qualified by the designation "lower" there is intended a branched or straight chain hydrocarbon of from 1 to about 6 carbon atoms.

It will be observed in Formula I that the alkanoyl portion of these thiolesters bears a di-(lower)alkyl-p-phenolic group. This phenolic group exhibits one (lower)-alkyl group, in a position ortho to the hydroxy group and a second (lower)alkyl group either (a) in the other position ortho to the hydroxy group or (b) in the position meta to the hydroxy group and para to the first (lower)-alkyl group. Preferred are the di(lower)alkyl-p-phenolic groups wherein the (lower)alkyl groups are branched groups such as t-butyl. Other arrangements, however, such as for example a 3-t-butyl-6-methyl-p-phenolic group, a 3,5-di-isopropyl-p-phenolic group, or a 3,5-dimethyl-p-phenolic group are included.

The integer $x$ can have a value of from 1 to 6, thus embracing substituted phenyl alkanoyl groups wherein the alkylene chain of the alkanoyl portion contains from 2 to 7 carbon atoms (including the carbonyl function). This chain may be straight or branched, i.e., the substituted phenyl group may be on the carbon atom of the chain most remote from the carbonyl function or on one of the intermediate carbon atoms of the chain. Preferred compounds are those wherein $x$ has a value of 2; e.g., the 3-(dialkyl-4-hydroxyphenyl)propionyl group.

A suitable method for the preparation of the compounds of the present invention involves the treatment of a mercaptan of the formula:

$$[HS]_n(-C_yH_{2y-n+2})$$

with an equivalent amount of a dialkylhydroxyphenylalkanoyl chloride, preferably in the presence of an acid binding agent such as pyridine and optionally an inert solvent such as benzene, xylene, toluene or the like.

These alkylhydroxyphenylalkanoic acid thiolo esters of the present invention are stabilizers of organic material normally subject to oxidative deterioration. Materials which are thus stabilized according to the present invention include synthetic organic polymeric substances such as vinyl resins formed from the polymerization of vinyl halides or from the copolymerization of vinyl halides with unsaturated polymerizable compounds, e.g., vinyl esters, $\alpha,\beta$-unsaturated aldehydes and unsaturated hydrocarbons such as butadienes and styrene; poly-$\alpha$-olefins such as polyethylene, polypropylene, polybutylene, polyisoprene and the like, including copolymers of poly-$\alpha$-olefins; polyurethanes such as are prepared from polyols and organic polyisocyanates; polyamides such as polyhexamethylene adipamide and polycaprolactam; polyesters such as polymethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubricating oil of the aliphatic ester type, e.g., di-(2-ethylhexyl)-azelate, pentaerythritol tetracaproate and the like; animal and vegetable derived oils, e.g., linseed oil, fat, tallow, lard, peanut oil, cod liver oil, castor oil, palm oil, corn oil, cotton seed oil and the like; hydrocarbon material such as gasoline, both natural and synthetic diesel oil, mineral oil, fuel oil, drying oil, cutting fluids, waxes, resins and the like, fatty acids such as soaps and the like.

In general the stabilizers of this invention are employed from about 0.005% to about 10% by weight of the stabilized composition. A particularly advantageous range for polyolefins such as polypropylene is from about 0.1% to about 1%.

The following examples will serve to further typify the nature of the present invention without being a limitation thereof.

EXAMPLE 1

1,2-bis-[3-(3,5-di-t-butyl-4-hydroxy-phenyl)propionylthio]butane (A) A mixture of 27.89 g. (0.10 mole) of 3-(3,5-di-t-butyl-4-hydroxyphenyl)propionic acid, 23.7 g. (0.20 mole) of thionyl chloride and 125 ml. of chloroform is heated at 55–60° C. with stirring for 20 hours. The volatiles are then removed under reduced pressure and the residue is dried for 30 minutes at 75° C./0.5 mm. to yield 3-(3,5-di-t-butyl-4 - hydroxyphenyl)propionyl chloride which can be used in part B of this example without further purification.

In a similar fashion from 3-(3,5-dimethyl-4-hydroxyphenyl)propionic acid; 3,5-dimethyl-4-hydroxyphenylacetic acid; 3-methyl-4-hydroxy - 5-t-butylphenylacetic acid; 3,5-di-isopropyl-4-hydroxyphenylacetic acid; and 3, 5-di-t-butyl-4-hydroxyphenylacetic acid, there are respectively obtained 3-(3,5-di-t-butyl-4-hydroxyphenyl) propionyl chloride; 3,5 - dimethyl-4-hydroxyphenylacetyl chloride; 3-methyl-4-hydroxy-5-t-butylphenylacetyl chloride; 3,5-di-isopropyl-4-hydroxyphenylacetyl chloride; and 3,5-di-t-butyl-4-hydroxyphenylacetyl chloride.

(B) The residue obtained in part A of this example is added to a mixture of 6.1 g. (0.05 mole) of 1,2-butanedithiol and 150 ml. of dry pyridine. This mixture is held at 25–30° C. for 20 hours and then heated at 45–50° C. for one hour. The mixture is cooled, treated with ice water and extracted with ether to yield 1,2-bis [3-(3,5-di - t-butyl - 4 - hydroxyphenyl)propionylthio] butane.

Substitution of equivalent amounts of 3-(3,5-dimethyl-4-hydroxyphenyl)propionyl chloride similarly yields 1,2-bis[3-(3,5-dimethyl - 4 - hydroxyphenyl)propionylthio] butane.

EXAMPLE 2 n-Dodecyl 3-(3,5-di-t-butyl-4-hydroxyphenyl) thiolopropionate

A reaction flask is preflushed with nitrogen and charged with 4.39 g. (0.0216 mole) of dodecylmercaptan, 2.66 g. (0.04 mole) of dry pyridine, and 25 ml. of dry benzene. A solution of 9.02 g. (0.0259 mole) of 3-(3,5-di-t-butyl-4-hydroxyphenyl)propionyl chloride in 45 ml. of dry benzene is added over a 40 minute period to the above described mixture. The mixture is stirred at room temperature (25° C.) for 24 hours. The insoluble solid present (pyridine hydrochloride) is filtered off and washed with benzene. The combined organic solutions are washed once with 100 ml. of cold water; four times with 50 ml. portions of 1 N hydrochloric acid with 50 ml. portions of water until neutral to pH paper, then twice with 50 ml. portions of saturated sodium chloride. After being dried overnight over molecular sieves, the solution is filtered and evaporated to dryness. The residue is dissolved in 15 ml. heptane and passed through a bed of alumina (300 g.) and eluted with heptane. The combined product fractions are stripped of solvent to yield a clear white liquid. This liquid is transferred to a distillation apparatus and distilled to yield the product, B.P. 203–220/0.03 mm.

Utilization of an equivalent amount of 2-methyl-3-(3,5-di-t-butyl-4-hydroxyphenyl)propionyl chloride yields n-dodecyl 2-methyl-3-(3,5-di - t-butyl-4-hydroxyphenyl) thiolopropionate.

EXAMPLE 3 n-Octadecyl 3-(3,5-di-t-butyl-4-hydroxyphenyl) thiolopropionate

A solution of 7.05 g. (0.025 mole) of n-octadecylmercaptan and 2.8 g. (0.035 mole) of dry pyridine in 50 ml. of benzene is placed in a 250 ml. reaction flask equipped with a magnetic stirring bar. A second solution is prepared from 10.30 g. (0.0299 mole) of 3-(3,5-di-t-butyl-4-hydroxyphenyl)propionyl chloride in 25 ml. of dry benzene. The second solution is added to the reaction flask at room temperature dropwise over a 30 minute period, and the resulting mixture is stirred at room temperature for 4 hours. The white solid (pyridine hydrochloride) in the reaction flask is removed by filtration under nitrogen and the filtrate is diluted with 25 ml. of ethanol and 125 ml. of benzene. The resulting solution is washed once with 100 ml. of ice-cold water to hydrolyse any unreacted acid chloride. The organic solution is then washed successively with 1 N hydrochloride acid (3× 100 ml.), water until neutral and finally saturated sodium chloride solution (2× 100 ml.). The solution is then dried, filtered and evaporated to dryness. The residue is recrystallized from acetone at a temperature of −5 to −10° C. to yield the product.

By substituting 3,5-dimethyl-4-hydroxyphenylacetyl chloride in this procedure there is obtained n-octadecyl 3,5-dimethyl-4-hydroxyphenylthioloacetate.

EXAMPLE 4 n-Octyl 3-(3,5-di-t-butyl-4-hydroxyphenyl) thiolopropionate

A mixture of 3.60 g. (0.025 mole) of n-octylmercaptan, 4.75 g. (0.06 mole) of dry pyridine and 30 ml. of dry benzene is placed in an apparatus which has been preflushed with nitrogen. A solution of 3-(3,5-di-t-butyl-4-hydroxyphenyl)propionyl chloride in 30 ml. of benzene is then added in a dropwise fashion to the primary reaction mixture over 30 minutes. The reaction mixture is stirred at room temperature overnight and then filtered to remove pyridine hydrochloride. The filtrate is washed five times with 100 ml. of 1 N hydrochloric acid; with water until neutral to pH paper; and then twice with 100 ml. portions of saturated sodium chloride solution. The resultant organic solution is dried over sodium sulfate, filtered and evaporated to dryness. The residue is dissolved in 25 ml. of heptane and added to a column packed with 200 g. of alumina, eluting with heptane. The fractions are combined and stripped of solvent, and the product is purified by vacuum distillation, B.P. 200° C./0.15 mm.

By substituting 3,5-di-isopropyl-4-hydroxyphenylacetyl chloride, there is obtained n-octyl 3,5-di-isopropyl-4-hydroxyphenyl)thioloacetate.

EXAMPLE 5

1,6-bis-[3-(3,5-di-t-butyl-4-hydroxyphenyl) propionylthio]hexane

A mixture of 2.25 g. (0.15 mole) of 1,6-dimercaptohexane and 50 ml. of dry pyridine is placed in a reaction flask which has been preflushed with nitrogen. This mixture is stirred until clear and 9.78 g. (0.033 mole) of 3 - (3,5-di-t-butyl-4-hydroxyphenyl)propionyl chloride is then added. The reaction temperature is kept below 30° for 30 minutes then stirred at room temperature overnight, and finally heated at 45 to 50° for one hour. The mixture is poured into 500 ml. of ice-water and extracted three times with 50 ml. portions of benzene and once with 50 ml. of ether. The combined organic extracts are washed with 3 N hydrochloric acid (5× 50 ml.); then with water until neutral and finally with saturated sodium chloride solution (2× 50 ml.). The organic phase is then dried over anhydrous sodium sulfate, filtered and the solvent removed. The residue is dissolved in 50 ml. of 1:1 benzene/heptane solution and passed through a bed of alumina (400 g.) eluting with 1:1 benzene/heptane (1 L). Upon removal of solvent, the residue is recrystallized three times from cold heptane to yield the product, M.P. 76–79° C.

In a similar fashion from 3-(3,5-dimethyl-4-hydroxyphenyl)propionyl chloride there is obtained 1,6-bis[3,5-dimethyl-4-hydroxyphenyl)propionylthio]hexane.

EXAMPLE 6

2-methyl-2-[3-(3,5-di-t-butyl-4-hydroxyphenyl) propionylthio]butane

By substituting 10.4 g. of 2-methyl-2-butanethiol for 1,2-butanethiol in the procedure of Example 1, there is obtained 2 - methyl - 2 - [3-(3,5-di-t-butyl-4-hydroxyphenyl)propionylthio]butane.

Similarly through the use of 50 g. of 2,2-di(mercaptomethyl)-1,3-propanedithiol there is obtained tetra[3-(3,5-di-t-butyl - 4 - hydroxyphenyl)propionylthiomethyl] methane.

From 26.7 g. of 1,2,3-propanetrithiol there is obtained 1,2,3 - tris[3-(3,5-di-t-butyl-4-hydroxyphenyl)propionylthio]propane.

EXAMPLE 7

Unstabilized polypropylene powder (Hercules Profax 6501) is thoroughly blended with 0.25% by weight of 1,6 - bis[3 - (3,5-di-t-butyl-4-hydroxyphenyl)propionylthio]hexane. The blended material is then milled on a two roller mill at 182° for 10 minutes after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is tested for resistance to accelerated aging in a forced draft oven at 149° C. As is evident from the table below, the composition of 0.25% by weight of a stabilizer and polypropylene is stabilized against oxidative deterioration.

|  | Hrs. |
|---|---|
| Polypropylene alone | 3 |
| 1,6 - bis[3 - (3,5-di-t-butyl-4-hydroxyphenyl)propionylthio]hexane | 1155 |

EXAMPLE 8

A stabilized mineral oil composition is prepared by incorporating into a refined mineral oil of 183 S.U.S. at 100° F. (Regal Oil B, Texas Company) 0.005% by weight of 1,6-bis[3-(3,5-dimethyl-4-hydroxyphenyl)propionylthio]hexane.

EXAMPLE 9

Stabilized lard is prepared by incorporating in lard 0.01% by weight of n-octyldecyl 3-(3,5-di-t-butyl-4-hydroxyphenyl)thiolopropionate. The lard, with and without stabilizer, is tested by the oxygen induction period method (ASTM D525-55) with the following changes: 15 parts of lard sample are tested; the end point is defined as gasoline having no additives and no stabilizers therein, the mid-point of the first hour in which a pressure drop of 2 lbs. per square inch or greater is noted, followed by an equivalent or greater drop in the succeeding hour. The unstabilized lard fails after 108 minutes.

Stabilized cotton seed oil is prepared when 0.01% by weight of this stabilizer is incorporated in a refined cotton seed oil. The unstabilized oil fails after 282 minutes.

EXAMPLE 10

Stabilized gasoline is prepared by incorporating into gasoline having no additives and no stabilizers therein, 0.05% by weight of 1,2-bis[3-(3,5-di-t-butyl-4-hydroxyphenyl)propionylthio]butane. The gasoline, with and without stabilizer is tested by the oxygen bomb induction period method (ASTM D525-55), the blank failing after 250 minutes.

EXAMPLE 11

Paraffin wax (M.P. 125-128° F.) is stabilized by incorporating therein 0.001% by weight of tetra [3-(3,5-di-t-butyl - 4 - hydroxyphenyl)propionylthiomethyl]methane. Stabilization is illustrated by the following test. The paraffin wax with stabilizer is heated for 18 hours at 121° in the presence of air. Unstabilized wax is also heated in like manner. After 18 hours the unstabilized wax exhibits a distinct odor.

EXAMPLE 12

A stabilized high temperature lubricating oil is prepared by incorporating 2% by weight of 1,6-bis-[3-(3,5-di-t-butyl-4-hydroxyphenyl)propionylthio]hexane into the lubricant, which comprises diisoamyladipate. The stabilized composition is compared with the unstabilized lubricant by heating at 175° in the presence of air and metallic catalysts according to the test method described in Military Specification Mil-L-7808c. After 72 hours the blank contains 83% sludge and has increased very greatly in viscosity.

EXAMPLE 13

High impact polystyrene resin containing elastomer (i.e., butadiene-styrene) is stabilized against loss of elongation properties by incorporation of 0.5% by weight of dodecyl 3-(2,5-di-t-butyl - 4 - hydroxyphenyl)thiolopropionate. Under the test conditions described below, the stabilized resin retains a higher percentage of its original elongation properties, whereas the unstabilized resin retains less elongation properties.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° and a pressure of 2000 pounds per square inch into a sheet of uniform thickness (25 mil). The sheets are then cut into strips, approximately 4 x 0.5 inches. A portion of these strips is then measured for length of elongation in the Instron Tensile tester (Instron Engineering Corporation, Quincy, Mass.). The remaining portion of the strips is aged in a forced draft oven for 6 weeks at 75° and thereafter tested for elongation.

Similar results are obtained with a terpolymer of acrylonitrile-butadiene-styrene.

EXAMPLE 14

A mixture of 1 kilogram of polyoxymethylene diacetate (molecular weight of about 30,000), 5 g. of n-octyl 3-(3,5-di-t-butyl-4-hydroxyphenyl)thiolopropionate and 2 g. of dicyandiamide are extruded at 220° C. Upon exposure to prolonged heating at 230° C., deterioration, as measured by weight loss, is significantly less for this composition than for the identical composition without the stabilizer.

EXAMPLE 15

A mixture of 1 M nylon 6,6 salt (hexamethylene diamine adipate) 0.01 M hexamethylene diamine and 1% by weight of 1,6-bis-[3-(3,5-dimethyl-4-hydroxyphenyl) propionylthio]hexane are added to a polymerization tube and heated for one hour at 220° C. and atmospheric pressure. The temperature is then raised to 285° C. and the pressure reduced slowly to 1 mm. The tube is maintained under these conditions for 30 minutes, cooled and flushed with nitrogen.

The thus stabilized polyhexamethylene adipate shows less color development and weight loss after heating at 140° C. in a forced air oven for 65 hours than does an unstabilized sample.

What is claimed is:

1. A compound of the formula:

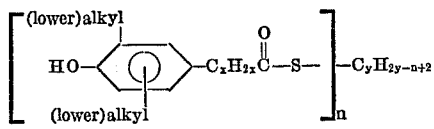

wherein
  $x$ has a value of from 1 to 6
  $y$ has a value of from 2 to 20, and
  $n$ has a value of from 1 to 6

2. A compound according to claim 1 wherein said compound is of the formula:

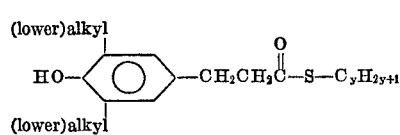

3. A compound according to claim 1 wherein said compound is of the formula:

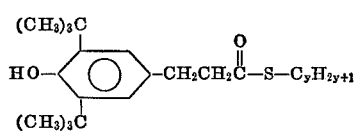

4. A compound according to claim 3 wherein the compound is dodecyl 3-(3,5-di-t-butyl-4-hydroxyphenyl)thiolopropionate.

5. A compound according to claim 3 wherein the compound is octadecyl 3-(3,5-di-t-butyl-4-hydroxyphenyl)thiolopropionate.

6. A compound according to claim 3 wherein the compound is octyl 3-(3,5-di-t-butyl-4-hydroxyphenyl)thiolopropionate.

7. A compound according to claim 1 wherein said compound is of the formula:

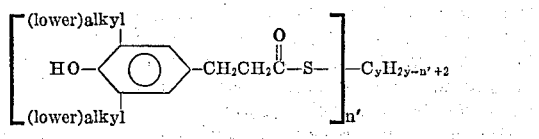

wherein $n'$ has a value of 2 to 6.

8. A compound according to claim 7 wherein said compound is of the formula:

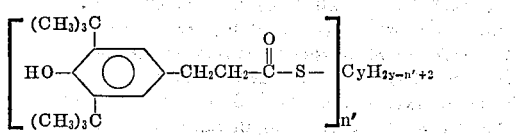

9. A compound according to claim 8 wherein the compound is 1,6-bis-[3-(3,5-di-t-butyl-4-hydroxyphenyl)propionylthio]hexane.

References Cited

UNITED STATES PATENTS

| 3,342,773 | 9/1967 | Mirviss et al. | 260—455 |
| 3,491,155 | 1/1970 | O'Shea | 260—455 |
| 3,285,855 | 11/1966 | Dexter et al. | 252—57 |
| 3,288,749 | 11/1966 | Cox | 260—45.95 |
| 3,323,930 | 6/1967 | Newland et al. | 260—45.95 |
| 3,330,859 | 7/1967 | Dexter et al. | 260—473 |

FOREIGN PATENTS

| 6,332 | 3/1967 | Japan | 260—455 |
| 1,298,704 | 6/1962 | France | 260—455 |

ELBERT L. ROBERTS, Primary Examiner

G. HOLLRAH, Assistant Examiner

U.S. Cl. X.R.

44—10; 99—163; 106—15; 252—48.6; 260—45.85, 45.95, 398.5, 810